(12) United States Patent
Sawada et al.

(10) Patent No.: US 6,917,673 B2
(45) Date of Patent: Jul. 12, 2005

(54) COMMUNICATION CONTROL APPARATUS AND COMMUNICATION CONTROL METHOD

(75) Inventors: Norishige Sawada, Yokohama (JP); Motohiro Abe, Yokosuka (JP)

(73) Assignee: Telefonaktiebolaget LM Ericsson, Stockholm (SE)

(*) Notice: Subject to any disclaimer, the term of this patent is extended or adjusted under 35 U.S.C. 154(b) by 639 days.

(21) Appl. No.: 10/128,925

(22) Filed: Apr. 24, 2002

(65) Prior Publication Data

US 2003/0138089 A1 Jul. 24, 2003

(30) Foreign Application Priority Data

Jan. 22, 2002 (JP) ........................................ 2002-013055

(51) Int. Cl.⁷ .................... H04M 3/42; H04M 3/46; H04M 3/56; H04M 3/58
(52) U.S. Cl. ..................... 379/201.02; 379/205.01; 379/207.02; 379/210.01; 379/211.03
(58) Field of Search .................... 379/201.01, 201.02, 379/204.01, 205.01, 207.01, 207.02, 210.01, 211.02, 211.03, 212.01, 221.08, 900; 455/414.1

(56) References Cited

U.S. PATENT DOCUMENTS

| | | | | |
|---|---|---|---|---|
| 4,975,945 A | * | 12/1990 | Carbullido | 379/265.01 |
| 5,038,340 A | * | 8/1991 | Ochiai | 370/238 |
| 5,668,640 A | * | 9/1997 | Nozawa et al. | 358/434 |
| 5,680,443 A | * | 10/1997 | Kasday et al. | 379/88.13 |
| 5,787,148 A | * | 7/1998 | August | 379/52 |
| 5,926,527 A | * | 7/1999 | Jenkins et al. | 379/93.01 |
| 6,542,594 B1 | * | 4/2003 | LeBoulzec | 379/201.03 |

FOREIGN PATENT DOCUMENTS

| | | |
|---|---|---|
| JP | 7177203 | 7/1995 |
| JP | 10108234 | 4/1998 |

\* cited by examiner

Primary Examiner—Harry S. Hong

(57) ABSTRACT

Communication control apparatus is provided for implementing a call relay service that makes it possible to construct and utilize a call relay network easily and reliably without relying upon special devices and a call relay list. A related communication control method provides a group composed of prescribed members with a call relay service having a communication control step. In accordance with this step, when a request to initiate the call relay service is received from an initiating member who is any member belonging to the group, control is exercised to cyclically connect a line between the members of the group, in an order starting from the initiating member.

36 Claims, 25 Drawing Sheets

INFORMATION CONCERNING GROUP 3587

URL: http://www.TCR.xx.jp/glog3587.html

*LATEST GROUP LOG*

GROUP ID: 3587
SERVICE START DATE AND TIME: 11/19/2001; 13:03
SERVICE END DATE AND TIME: 11/19/2001; 14:01

| DATE AND TIME | CALL ORIGINATOR | STATUS | CALL DESTINATION |
|---|---|---|---|
| 2001.11.19 13:05 | Aki | BACK | Bob |
| 2001.11.19 13:08 | Bob | RESPONDING; CONTINUING | Daniel |
| | Daniel | NON-RESPONDING (BUSY) | |
| 2001.11.19 13:09 | Bob | RESPONDING; STANDING BY | Ethan |
| 2001.11.19 13:15 | Ethan | RESPONDING; CONTINUING | Cathy |
| | Cathy | NON-RESPONDING (BUSY) | |
| 2001.11.19 13:17 | Ethan | RESPONDING; CONTINUING | |
| 2001.11.19 13:47 | Ethan | RESPONDING; CONTINUING | Cathy |
| 2001.11.19 13:55 | Cathy | RESPONDING; CONTINUING | Daniel |
| 2001.11.19 14:01 | Daniel | RESPONDING; CONTINUING | Aki |
| 2001.11.19 14:01 | Aki | COMPLETED | |

```
                    LOG-IN SCREEN
 URL: [≑] http://www.TCR.xx.jp/login.html

WELCOME TO THE CALL RELAY SERVICE SITE !
 ENTER ADMINISTRATIVE USER ID (EIGHT ALPHANUMERIC
 CHARACTERS OR LESS) YOU WISH TO REGISTER. THEN
 CLICK THE "SEND" BUTTON.

[                    ]
 [ RESET ]  [ SEND ]
```

*FIG. 3*

LOG-IN SCREEN

URL: http://www.TCR.xx.jp/login2.html

*WELCOME TO THE CALL RELAY SERVICE SITE !*
YOUR TELEPHONE NUMBER IS 090-1234-XXXX.
IF YOU WISH TO REGISTER AN ADMINISTRATIVE USER ID IN ADDITION TO YOUR TELEPHONE NUMBER, THEN ENTER THE ADMINISTRATIVE USER ID (EIGHT ALPHANUMERIC CHARACTERS OR LESS) YOU WISH TO REGISTER. THE CLICK THE "SEND" BUTTON.
IF YOU ARE NOT REGISTERING AN ADMINISTRATIVE USER ID, THEN CLICK THE "SEND" BUTTON WITHOUT MAKING AN ENTRY.

[ RESET ] [ SEND ]

*FIG. 4*

REGISTRATION CONFIRMATION SCREEN

URL: http://www.TCR.xx.jp/confirm.html

*REGISTRATION HAS SUCCEEEDED !*

THE FOLLOWING IS WHAT YOU REGISTERED:
 ADMINISTRATIVE USER ID: ABC1234
 PASSWORD: axb4ud83AB
YOU WILL NEED YOUR PASSWORD WHENEVER YOU LOG IN SUBSEQUENTLY, SO DO NOT FORGET TO MAKE A RECORD OF IT.

[ RESET ]  [ SEND ]

*FIG. 5*

```
                    FAILED REGISTRATION
  URL:  [⇕]  [ http://www.TCR.xx.jp/regerr.html            ]

REGISTRATION HAS FAILED !
  THE USER ID YOU ENTERED IS ALREADY BEING USED BY
  ANITHER PERSON.
  RE-ENTER ADMINISTRATIVE USER ID (EIGHT ALPHANUMERIC
  CHARACTERS OR LESS) YOU WISH TO REGISTER. THEN
  CLICK THE "SEND" BUTTON.

[                    ]
  [ RESET ]  [ SEND ]
```

*FIG. 6*

| ADMINISTRATIVE USER ID | PASSWORD | SUBSCRIBER NUMBER |
|---|---|---|
| ABCXXXX | ab3vdhfy4 | |
| BDYXa47 | zziy7s99s | 090-1234-XXXX |
| | bczwXai6 | 090-5439-YYYY |
| | | |
| | | |
| | | |

| GROUP ID | ADMINISTRATIVE USER ID |
|---|---|
| 3587 | ABC1234 |
| 3588 | ZC16 |
| 3589 | B18A98 |

*FIG. 11*

MEMBERSHIP REGISTRATION

URL: http://www.TCR.xx.jp/groupreg.html

*GROUP MEMBERSHIP REGISTRATION (GROUP ID: 3587)*

YOU MAY REGISTER GROUP MEMBERS WHO CAN UTILIZE
THE CALL RELAY SERVICE.
ENTER THE MEMBER NAMES AND TELEPHONE NUMBERS.

MEMBER NAME [ ]   TELEPHONE NUMBER [ ]
MEMBER NAME [ ]   TELEPHONE NUMBER [ ]
MEMBER NAME [ ]   TELEPHONE NUMBER [ ]
MEMBER NAME [ ]   TELEPHONE NUMBER [ ]

[RESET]   [SEND]

*FIG. 13*

| GROUP ID | MEMBER NAME | TELEPHONE NUMBER | STATUS CODE |
|---|---|---|---|
| 3587 | Aki | 090-111-XXXX | 0 |
| 3587 | Bob | 090-5555-XXXX | 0 |
| 3587 | Cathy | 070-3333-YYYY | 0 |
| 3587 | Daniel | 06-4444-XXXX | 0 |
| 3587 | Ethan | 090-333-YYYY | 0 |

*FIG. 14*

INFORMATION CONCERNING GROUP 3587

URL: http://www.TCR.xx.jp/ginfo3587.html

*LIST OF GROUP INFORMATION*

GROUP ID: 3587
ADMINISTRATIVE USER ID: ABC1234
NUMBER OF MEMBERS REGISTERED: 5
REGISTRATION DATE AND TIME: 11/19/2001; 23:33

| MEMBER NAME | TELEPHONE NUMBER | DELETE |
|---|---|---|
| Aki | 090-111-XXXX | ☐ |
| Bob | 03-5555-XXXX | ☐ |
| Cathy | 070-3333-YYYY | ☐ |
| Daniel | 06-4444-XXXX | ☐ |
| Ethan | 090-333-YYYY | ☐ |

CHANGE IF NECESSARY AND THEN PRESS THE "OK" BUTTON.
(IF MEMBER IS TO BE DELETED, CLICK THE "OK" BUTTON.)

[ABORT]  [OK]

CLICK HERE TO ADD MEMBER    CLICK HERE TO DELETE ENTIRE GROUP

*FIG. 16*

| STATUS CODE | STATUS |
| --- | --- |
| 0 | UNCALLED |
| 1 | INITIATING USER |
| 10 | RESPONDING (CONTINUING) |
| 11 | RESPONDING (STANDING BY) |
| 20 | NON-RESPONDING (BUSY) |
| 21 | NON-RESPONDING (TEMPORARY REFUSAL) |
| 22 | NON-RESPONDING (PHONE-ANSWERIING MACHINE) |
| 80 | MEMBER EXCLUDED FROM CALLS (ON PER-SERVICE-EXECUTION BASIS) |
| 88 | MEMBER EXCLUDED FROM CALLS (PERMANENTLY) |
| 91 | COMPLETED (INITIATING USER) |
| 99 | COMPLETED |

| MEMBER NAME | S C |
|---|---|
| Aki | 1 |
| Bob | 0 |
| Cathy | 0 |
| Daniel | 0 |
| Ethan | 0 |

(b)

| MEMBER NAME | S C |
|---|---|
| Aki | 91 |
| Bob | 10 |
| Cathy | 0 |
| Daniel | 0 |
| Ethan | 0 |

(c)

| MEMBER NAME | S C |
|---|---|
| Aki | 91 |
| Bob | 10 |
| Cathy | 0 |
| Daniel | 20 |
| Ethan | 0 |

(d)

| MEMBER NAME | S C |
|---|---|
| Aki | 91 |
| Bob | 99 |
| Cathy | 0 |
| Daniel | 20 |
| Ethan | 10 |

(e)

| MEMBER NAME | S C |
|---|---|
| Aki | 91 |
| Bob | 99 |
| Cathy | 20 |
| Daniel | 20 |
| Ethan | 11 |

(f)

| MEMBER NAME | S C |
|---|---|
| Aki | 91 |
| Bob | 99 |
| Cathy | 20 |
| Daniel | 20 |
| Ethan | 10 |

(g)

| MEMBER NAME | S C |
|---|---|
| Aki | 91 |
| Bob | 99 |
| Cathy | 10 |
| Daniel | 20 |
| Ethan | 99 |

(h)

| MEMBER NAME | S C |
|---|---|
| Aki | 91 |
| Bob | 99 |
| Cathy | 99 |
| Daniel | 10 |
| Ethan | 99 |

(i)

| MEMBER NAME | S C |
|---|---|
| Aki | 91 |
| Bob | 99 |
| Cathy | 99 |
| Daniel | 99 |
| Ethan | 99 |

*FIG. 21*

| DATE AND TIME | CALL ORIGINATOR | STATUS | CALL DESTINATION |
|---|---|---|---|
| 2001.11.19 13:05 | Aki | CALLING | Bob |

(a)

| DATE AND TIME | CALL ORIGINATOR | STATUS | CALL DESTINATION |
|---|---|---|---|
| 2001.11.19 13:05 | Aki | CALLING | Bob |
| 2001.11.19 13:08 | Bob | RESPONDING; CONTINUING | Daniel |
| | Daniel | NON-RESPONDING (BUSY) | |

(b)

| DATE AND TIME | CALL ORIGINATOR | STATUS | CALL DESTINATION |
|---|---|---|---|
| 2001.11.19 13:05 | Aki | CALLING | Bob |
| 2001.11.19 13:08 | Bob | RESPONDING; CONTINUING | Daniel |
| | Daniel | NON-RESPONDING (BUSY) | |
| 2001.11.19 13:09 | Bob | RESPONDING; STANDING BY | Ethan |

(c)

| DATE AND TIME | CALL ORIGINATOR | STATUS | CALL DESTINATION |
|---|---|---|---|
| 2001.11.19 13:05 | Aki | CALLING | Bob |
| 2001.11.19 13:08 | Bob | RESPONDING; CONTINUING | Daniel |
| | Daniel | NON-RESPONDING (BUSY) | |
| 2001.11.19 13:09 | Bob | RESPONDING; STANDING BY | Ethan |
| 2001.11.19 13:15 | Ethan | RESPONDING; CONTINUING | Cathy |
| | Cathy | NON-RESPONDING (BUSY) | |
| 2001.11.19 13:17 | Ethan | RESPONDING; CONTINUING | |

(d)

| DATE AND TIME | CALL ORIGINATOR | STATUS | CALL DESTINATION |
|---|---|---|---|
| 2001.11.19 13:05 | Aki | CALLING | Bob |
| 2001.11.19 13:08 | Bob | RESPONDING; CONTINUING | Daniel |
| | Daniel | NON-RESPONDING (BUSY) | |
| 2001.11.19 13:09 | Bob | RESPONDING; STANDING BY | Ethan |
| 2001.11.19 13:15 | Ethan | RESPONDING; CONTINUING | Cathy |
| | Cathy | NON-RESPONDING (BUSY) | |
| 2001.11.19 13:17 | Ethan | RESPONDING; CONTINUING | |
| 2001.11.19 13:47 | Ethan | RESPONDING; CONTINUING | Cathy |
| 2001.11.19 13:55 | Cathy | RESPONDING; CONTINUING | Daniel |
| 2001.11.19 14:01 | Daniel | RESPONDING; CONTINUING | Aki |
| 2001.11.19 14:01 | Aki | COMPLETED | |

```
                    LOG-IN SCREEN
  URL: [≑] http://www.TCR.xx.jp/login4.html WELCOME TO THE CALL RELAY SERVICE SITE !
  ENTER YOUR TELEPHONE NUMBER AND THE GROUP ID OF
  THE GROUP WHOSE INFORMATION YOU WISH TO VIEW. THEN
  CLICK "SEND" BUTTON.
  YOU CANNOT VIEW INFORMATION CONCERNING A GROUP YOU
  HAVE NOT REGISTERED.

TELEPHONE NUMBER: [            ]

GROUP ID:         [            ]

[ RESET ]  [ SEND ]
```

*FIG. 24*

COMMUNICATION CONTROL APPARATUS AND COMMUNICATION CONTROL METHOD

BACKGROUND OF THE INVENTION

1. Field of the Invention

This invention relates to a communication control apparatus and communication control method for implementing a call relay service in a telephone communication system.

2. Description of Related Art

When there is a change in a planned event in an organization such as a school or company, it may be necessary to convey the same information to each individual belonging to a class or post. Known methods according to the prior art for when the same message is to be conveyed to a plurality of individuals include three methods: 1) a method of creating a call relay network beforehand among contactee individuals targeted for the relay service and having each individual transmit the message successively in a sequence set forth in the relay network, 2) a method, as described in the specifications of Japanese Patent Application Laid-Open Nos. 10-108234 and 7-177203, which uses a pager or telephone, etc., having a special function for automating the message transmission processing, and 3) a method of broadcasting the message by electronic mail.

However, these conventional methods have the following problems: With method 1), it is necessary for all contactee individuals to possess a list describing the call relay network. If the list is lost or a contactee individual is out, the message cannot be conveyed to the next individual to be contacted. Further, if someone in the relay network does not convey the message, then the message will not be relayed to the remaining individuals that are to be contacted.

With method 2), it is only possible to construct a call relay network in which only individuals possessing a pager or telephone having the special function for the call relay network become contactee members. Further, a person who wishes to be registered with the call relay network anew is required to purchase new equipment.

Method 3) makes it possible to transmit the same message to a plurality of contactees with almost no time difference and is easy. For this reason, the method has come into widespread use with the popularization of electronic mail. However, since all individuals do not necessarily possess an e-mail address, as with methods 2) and 3), it is possible to construct only a call relay network with which limited members only are registered. Further, because an e-mail address is changed comparatively frequently, unlike a mailing address and telephone number, it is not rare for messages to go undelivered. In addition, even if an email arrives properly, the receiving party does not necessarily read the mail promptly, and sometimes the mail might be left unread for a number of days.

Thus, in the prior art in which the same message is transmitted to a plurality of parties, a call relay network in which special equipment is not used and which is capable of reliable message transmission has not been realized.

SUMMARY OF THE INVENTION

The present invention, which has been devised in view of the aforementioned problems of the prior art, provides a communication control apparatus and communication control method for implementing a call relay service that makes it possible to construct and utilize a call relay network easily and reliably without relying upon special devices and call relay list.

Specifically, the gist of the present invention is a communication control apparatus for providing a group composed of prescribed members with a call relay service, characterized by a communication control means for performing control in such a manner that when start of the call relay service is requested from an initiating member who is any member belonging to the group, a line is connected between the members in the group cyclically, in an order starting from the initiating member.

The gist of the present invention according to another aspect is directed to providing a group composed of prescribed members with a call relay service, wherein a communication control performs control in such a manner that the call relay service is initiated by a request from an initiating member, who may be any member belonging to the group. Upon initiation of the service, a line is connected between the members in the group cyclically, in an order beginning with the initiating member.

BRIEF DESCRIPTION OF THE DRAWINGS

FIG. 3 is a diagram illustrating an example of a log-in page presented to a user in processing for registering an administrative user;

FIG. 4 is a diagram illustrating a further example of a log-in page presented to a user in processing for registering an administrative user;

FIG. 5 is a diagram illustrating an example of a registration confirmation page presented to a user in processing for registering an administrative user;

FIG. 6 is a diagram illustrating an example of a registration error page presented to a user in processing for registering an administrative user;

FIG. 7 is a diagram illustrating an example of the structure of an administrative user table recorded in a database;

FIG. 11 is a diagram showing an example of the structure of a group table in the database of FIG. 7;

FIG. 13 is a diagram showing an example of a member registration page presented to an administrative user in group-member registration processing;

FIG. 14 is a diagram showing an example of the structure of a member table recorded in the database of FIG. 7;

FIG. 16 is a diagram showing an example of a group-information page presented to an administrative user in group-information management processing;

FIG. 20 is a diagram showing an example of the structure of a status table stored in the database of FIG. 7;

FIG. 21 is a diagram for describing changes in a member table during execution of the communication control service;

FIG. 22 is a diagram for describing changes in a service log during execution of the communication control service;

FIG. 24 is a diagram showing an example of a log-in page presented to a user in processing for accessing group information.

DETAILED DESCRIPTION OF A PREFERRED EMBODIMENT

Figure 1:
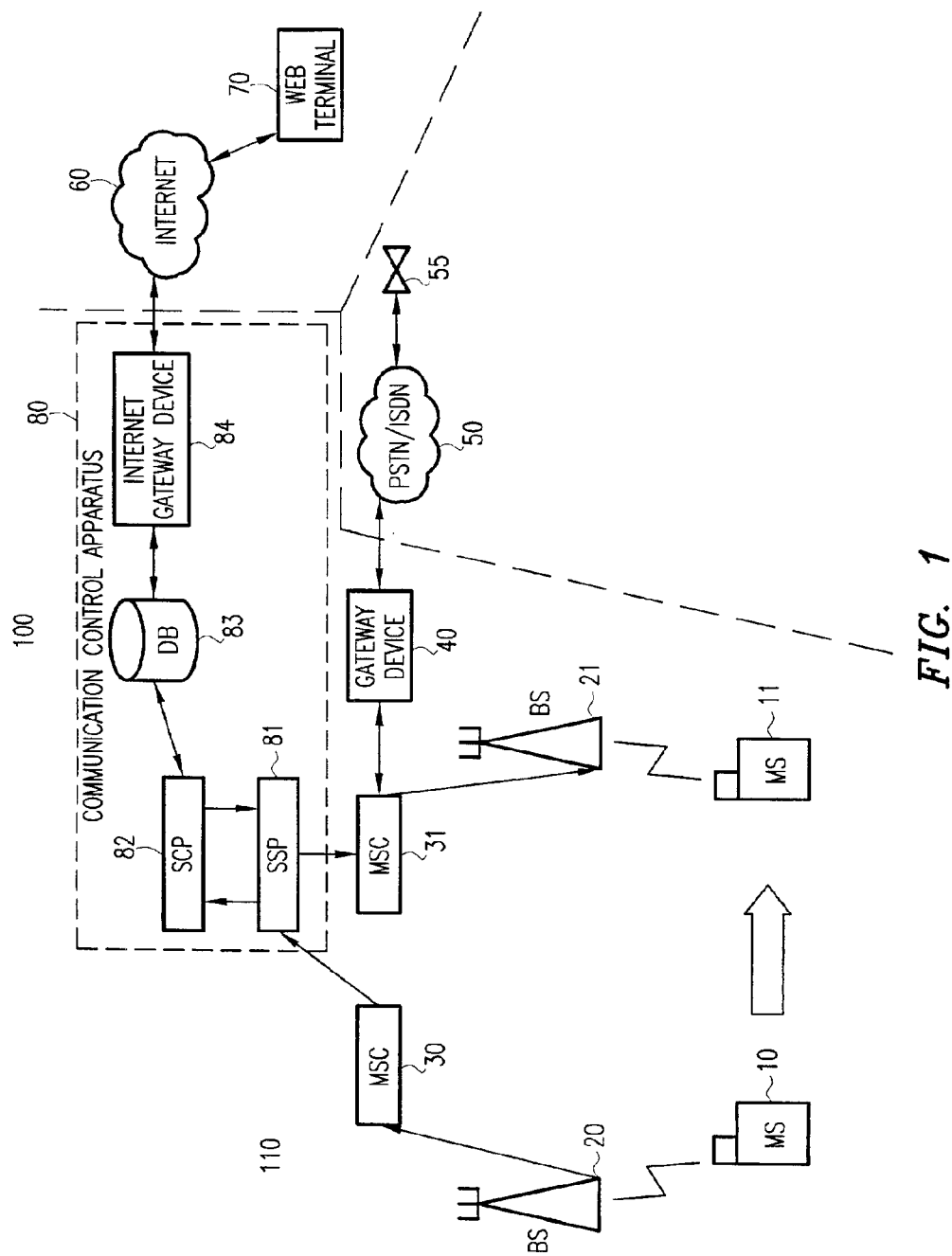
FIG. 1 is a diagram illustrating an example of the overall configuration of a network system that uses a communication control apparatus according to an embodiment of the present invention.

A preferred embodiment of the present invention will now be described in detail with reference to the drawings. FIG. 1 illustrates an example of the overall configuration of a communication system to which a communication control apparatus according to an embodiment of the present invention can be applied. In the embodiment described below, the communication control apparatus according to the present invention provides a call relay service as a so-called intelligent network (IN) service.

A communication system 100 has a mobile wireless communication network 110, a public switched telephone network (PSTN/ISDN) 50, and the Internet 60 serving as an example of a packet-data communication network.

The mobile wireless communication network 110, which is implemented using well-known mobile wireless communication technology, such as a cellular scheme, has mobile stations (MS) 10, 11, base stations (BS) 20, 21, mobile service exchanges (MSC) 30, 31, and a gateway device 40. Though the mobile stations, base stations and mobile service exchanges illustrated are each two in number for the sake of simplifying the description, in actuality a large number of these devices are included.

The mobile wireless communication network 110 is connected to the public switched telephone network 50 via the gateway device 40 so that it is possible for a fixed-line subscriber telephone 55, which has been connected to the public switched telephone network 50, and the mobile stations 10, 11 within the mobile wireless communication network 110 to be connected together.

A communication control apparatus 80 is connected to the mobile service exchanges 30, 31 included in the mobile wireless communication network 110 and provides the mobile stations 10, 11 or fixed-line subscriber telephone 55 with a call relay service as described below. The communication control apparatus 80 is further connected to the Internet 60, which is an example of a data communication network and supplies service-related information to a Web terminal 70 by means of the Internet 60, described hereinafter in further detail.

In this specification, "Web terminal" refers to all information communication terminals having a capability of browsing information on a server accessible via the Internet 60 and includes personal computers and PDAs (Personal Digital Assistant) as well as mobile and fixed-line telephones (also referred to as browser phones) having such a browsing function. The mobile stations 10, 11 also include PHS terminals.

The communication control apparatus 80 has a service control point (SCP) 82 for carrying out control tasks corresponding to a call relay service; a service switching point (SSP) 81 for executing call processing based upon service control by the SCP 82; a database 83 for storing various voice/text messages and information relating to service subscribers; and an Internet gateway device 84, which is a gateway for performing communication via the Internet 60. The Internet gateway device 84 functions also as a Web server in this embodiment, as will be described later.

It is possible for the communication control apparatus 80 to be constructed from a general-purpose computer having a hardware and software environment that enables communication with the mobile service exchanges 30, 31 and Internet 60. Specifically, the communication control apparatus 80 has a CPU, a RAM, a ROM, a hard-disk drive and various interfaces, and the CPU executes a control program that has been stored in the hard-disk drive and/or ROM and exercises various types of control to thereby make possible the implementation of the functions of communication control apparatus 80, described below.

The control program may be supplied by a recording medium such as a CD-ROM or via a computer network such as the Internet 60.

FIG. 1 illustrates only the minimum structure necessary for describing the present invention. In actuality, the communication system 100 has a variety of other elements not illustrated for implementing all functions inclusive of those mentioned. However, a detailed description of these elements not illustrated is omitted so as not to impede an understanding of the present invention.

Overview of Call Relay Service

Before describing the specifics of processing, an overview of a call relay service provided by the communication control apparatus 80 according to this embodiment of the present invention will be described.

The call relay service according to this embodiment includes a communication control service for managing and controlling calls generated in the relay network, and an information management service for managing information relating to the call relay service.

The communication control service is provided to members (group members) belonging to a group registered in advance utilizing the information management service.

In the information management service, processing relating to group management, namely registration and deletion of groups and addition/removal of group members, is only allowed to an administrator registered beforehand for every group. Further, in the information management service, all group members are allowed to read status information, etc., relating to a service currently being performed or performed in the past.

Information Management Service: Group Management

Group management processing in the information management service will be described first.

In this embodiment, the information management service is provided to the Web terminal 70, which is capable of accessing the communication control apparatus 80 via the Internet 60. Specifically, the Internet gateway device 84 and database 83 of the communication control apparatus 80 have the function of a Web server, which constitutes group information management means, and provide the information management service via a Web page made available by the Web server.

For the sake of convenience, the Web terminal 70 used when a user utilizes the information management service and telephones (MS 10, 11 or fixed-line subscriber telephone 55) used when the user utilizes the communication control service shall be described as separate devices. However, in a case where the user employs a telephone that is capable of operating as the Web terminal 70, both services can be utilized by the same terminal.

In this case, the telephone is connected to the Internet 60 via a data communication line, unlike an ordinary telephone, and functions as the Web terminal 70. It should be noted that since techniques for utilizing the Internet from a mobile wireless telephone or fixed subscriber telephone are well known, the details thereof need not be described herein.

Administrator Registration Processing

Figure 2:
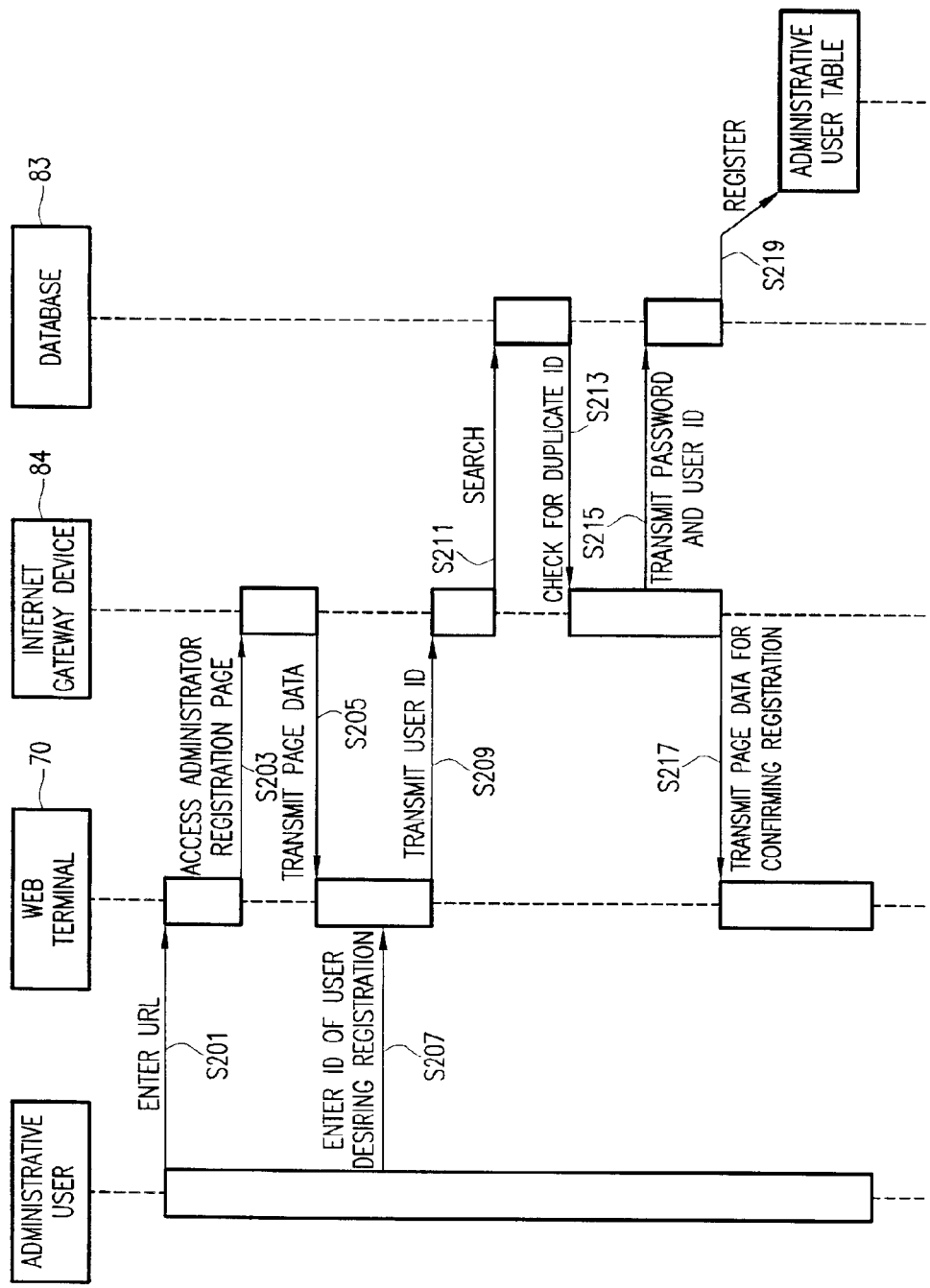
FIG. 2 is a sequence chart for describing administrative user registration processing using the communication control apparatus according to this embodiment of the present invention.

FIG. 2 is a sequence chart illustrating an administrator registration procedure in group management processing.

First, a user who wishes to be registered as an administrator enters a predetermined URL (step S201) for administrator registration to a browser application running on the Web terminal 70 and instructs the browser to access the URL. The Web terminal 70 accesses the designated URL by a well-known method (step S203). The Internet gateway device 84 functioning as a Web server responds to this access request by transmitting administrator registration page data (step S205) specified by the URL. The Web terminal 70 interprets the received registration page data, presents the data to the user and waits for entry of a user ID. FIG. 3 illustrates an example of a page for registering an administrator.

Furthermore, if the Web terminal 70 is a telephone and the Internet gateway device 84 is capable of acquiring the subscriber number (or terminal ID) thereof, then the acquired subscriber number can be used as the administrative user ID. This means that entry of the user ID is not necessarily required. In this case, the acquired subscriber number is presented and administrator management page data indicating that entry of an administrative user ID can be omitted is transmitted at step S205.

When the administrative user ID that the user wishes to be registered is entered (step S207), the Web terminal 70 transmits the entered administrative user ID to the Internet gateway device 84 (step S209). The Internet gateway device 84 searches the database 83 (step S211) to determine whether the received administrator ID has already been registered or not. If the result of the search (step S213) is that the administrative user ID has not been registered with the database 83, then the Internet gateway device 84 generates a password (step S215) by a prescribed method and registers it (step S219) in an administrative user table of the database 83 together with the user ID received at step S209.

At the same time, the Internet gateway device 84 transmits registration confirmation page data to the Web terminal 70 (step S217). An example of a registration confirmation screen is shown in FIG. 5.

If the result of the search at step S211 is that the same user ID has already been registered, then page data instructing re-input for prompting the user to enter the desired user ID again is transmitted to the Web terminal 70 together with an error message of the kind shown in FIG. 6 and processing from step S207 onward is repeated.

FIG. 7 illustrates an example of the structure of an administrative user table recorded in the database 83. The administrative user table is composed of a user ID field 501, a password field 502 and a subscriber number field 503, in each of which the corresponding value is stored. In a case where a telephone is used as the Web terminal 70 and the subscriber number of this telephone is capable of being acquired by the Internet gateway device 84, a user ID is not necessarily required, as mentioned earlier. With regard to a subscriber user for which a subscriber number is stored in the subscriber number field 503, therefore, there are cases where the user ID field 501 is left blank.

Group Registration Processing

Figure 8:
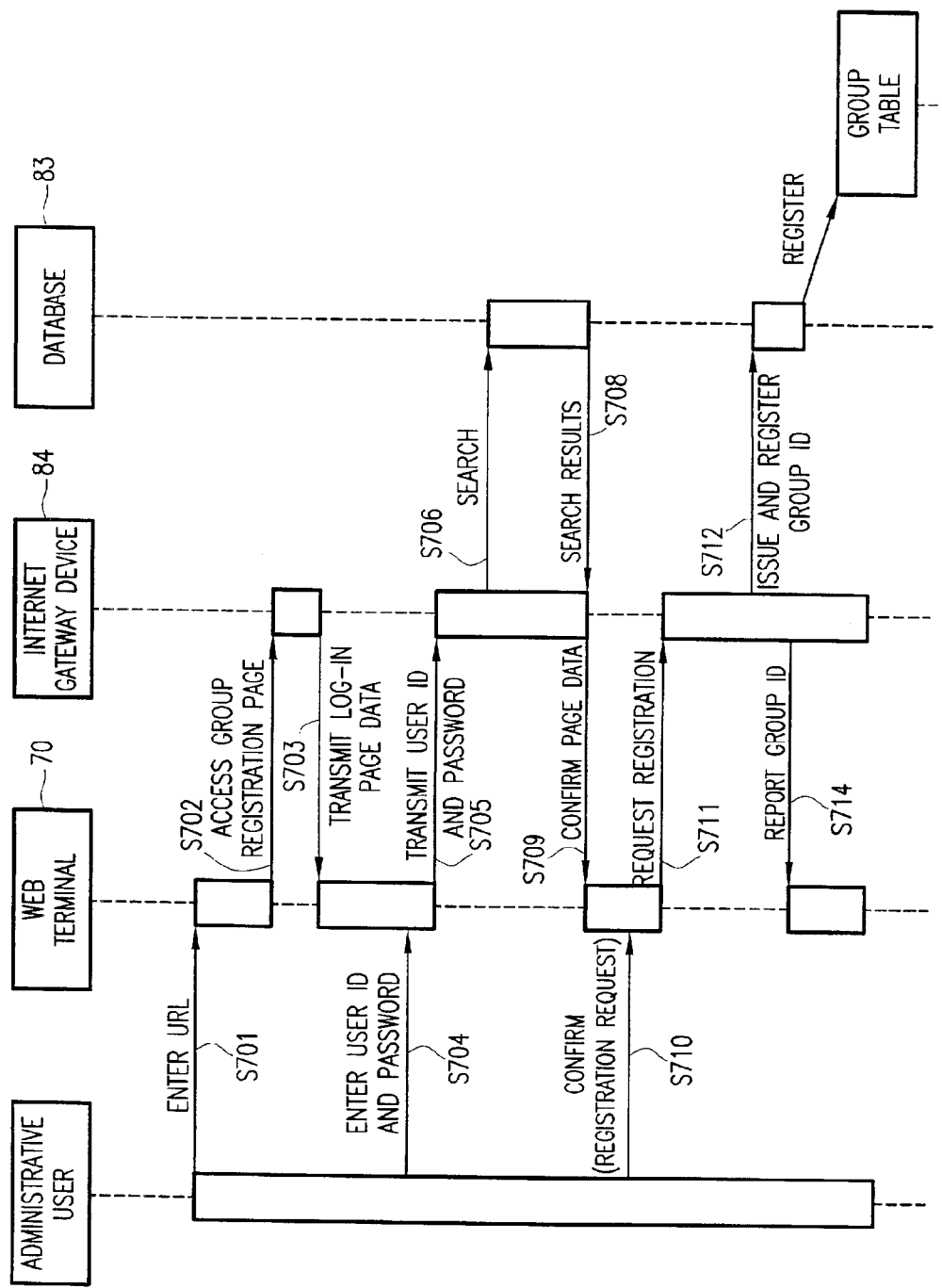
FIG. 8 is a sequence chart for describing group registration processing using the communication control apparatus according to this embodiment of the present invention.

Group registration processing will be described next using a sequence chart shown in FIG. 8.

First, a user who wishes to register a group enters a predetermined URL (step S701) for group registration to a browser application running on the Web terminal 70 and instructs that this URL be accessed. The Web terminal 70 accesses the designated URL by a well-known method (step S702). The Internet gateway device 84 functioning as a Web server responds to this access request by transmitting group-registration log-in page data (step S703) specified by the URL.

Figure 9:
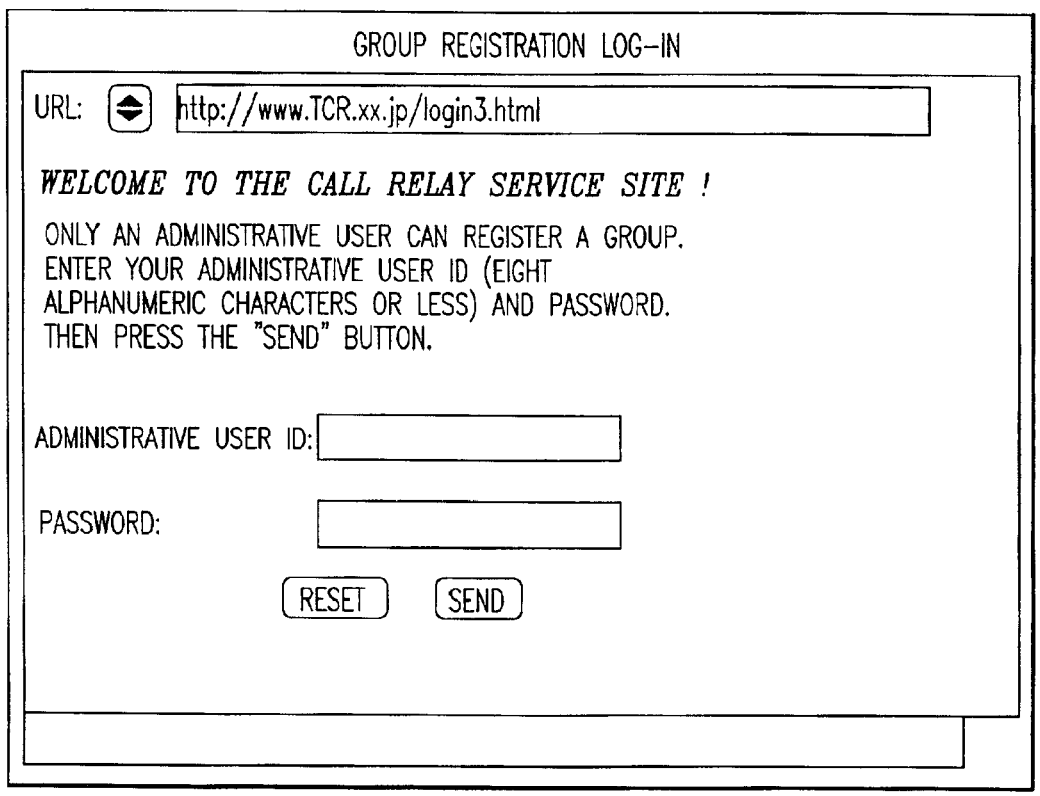
FIG. 9 is a diagram illustrating an example of a log-in page presented to the user in group registration processing.

FIG. 9 illustrates an example of the log-in page data for group registration. Since processing to register a group is processing that only an administrative user can execute, entry of a user ID and password is requested on the log-in page. The Web terminal 70 presents the log-in page to the user and waits for entry of the user ID and password.

If the user enters the user ID and password and clicks a send button (step S704), the Web terminal 70 transmits both items to the Internet gateway device 84 (step S705). The Internet gateway device 84 looks up the administrative user table of database 83 using the user ID and password received (step S706).

Figure 10:
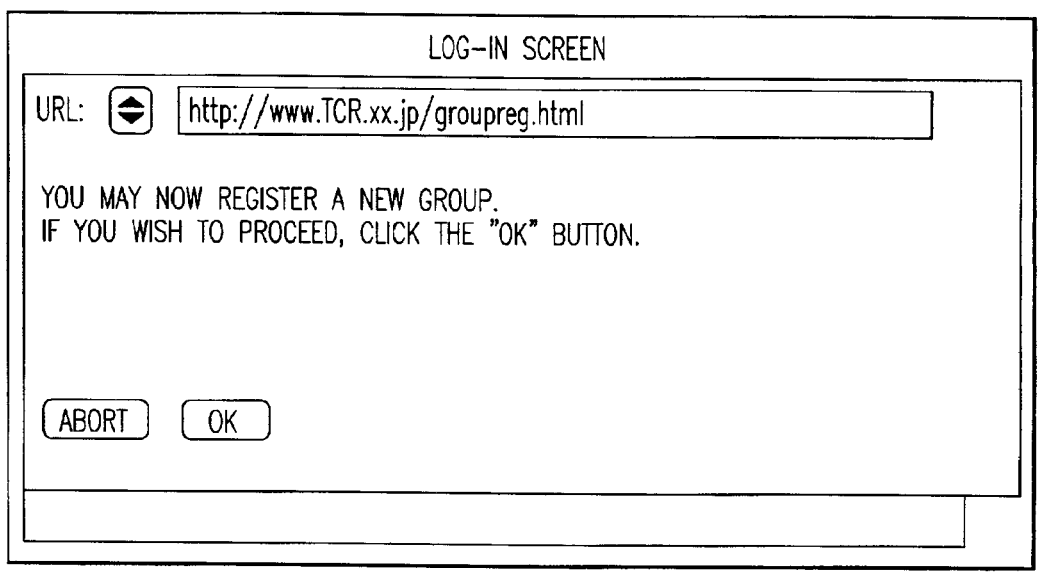
FIG. 10 is a diagram illustrating an example of a registration confirmation page presented to an administrative user in group registration processing.

If the result of referring to the user ID field 501 and password field 502 of the administrative user table is confirmation that the user is a registered administrative user (step S708), confirmation page data of the kind shown for example in FIG. 10 for reporting that group registration is possible is transmitted to the Web terminal 70 (step S709). If the user ID has not been registered as the administrative user ID and/or the password does not match, log-in page data that includes error notification is transmitted and processing from step S704 onward is repeated.

If an "OK" button is clicked on the screen of FIG. 10 to confirm the intent to newly register a group (step S710), then the Web terminal 70 requests the Internet gateway device 84 to issue a group ID (step S711).

In response to this request, the Internet gateway device 84 generates a group ID anew and registers the generated group ID in a group table of the database 83 in association with the administrative user ID (step S712). Any method can be used to issue the group ID. For example, numbers can simply be assigned in order starting from No. 1, or IDs can be created using the characters of the alphabet, such as A, B, C, . . . , Z, AA, AB, . . . . Further, if a user ID is "ABC", for example, consecutive numbers may be added on to the end of the user ID, as in the manner "ABC0001", "ABC0002", and the result may be used as the group ID.

FIG. 11 illustrates an example of the structure of the group table in database 83. Furthermore, any item may be added to and registered in the group table in addition to the items shown in FIG. 11. Examples are group registration date and time, the last date and time on which group information was changed, and the number of group members, etc.

Figure 12:
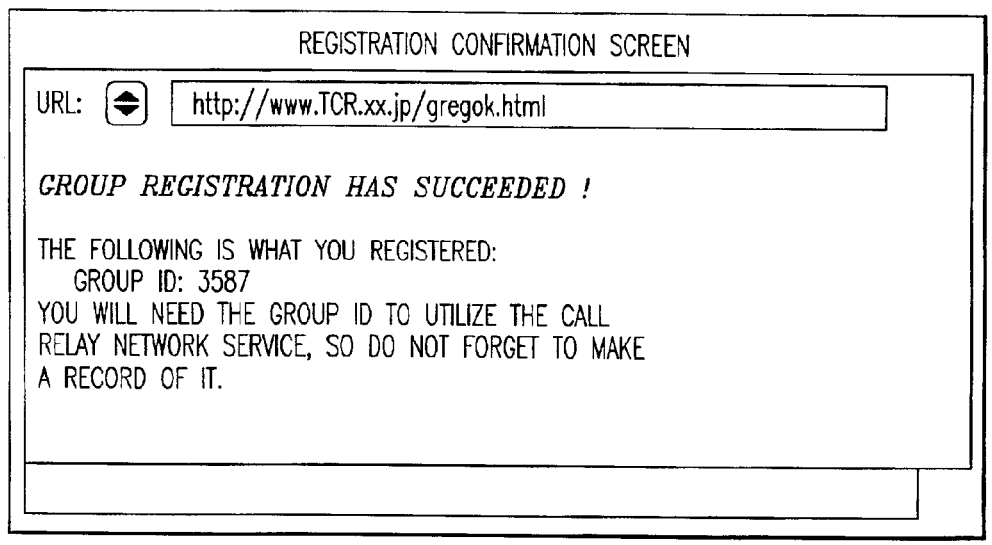
FIG. 12 is a diagram illustrating an example of a group-registration notification page presented to an administrative user in group registration processing.

The Internet gateway device 84 further transmits notification page data, which is for notifying the administrative user of the issued group ID, to the Web terminal 70 (step S714). FIG. 12 illustrates an example of the notification page.

Member Registration Processing

If a group has been registered, members belonging to the group (group members) are registered next. The call relay service of this embodiment is allowed to be utilized by group members, as mentioned above. Processing for registering members may be executed automatically after group registration or independently of group registration processing. In the latter case, it will suffice to implement this processing as one process in group-information maintenance processing (addition, deletion and revision of members).

Member registration processing also is processing that only an administrative user can execute. Accordingly, authentication processing of the kind described at steps S701 to S708 in FIG. 8 is required to be executed except in a case where member registration processing is performed following group registration processing. An instance where a member is registered following group registration processing will be described below.

The Internet gateway device 84 transmits group-member registration page data of the kind shown for example in FIG. 13, rather than the verification page data transmitted at step S709, to the Web terminal 70 of an administrative user who has been authenticated. If the administrative user enters the name and telephone number of a member to be registered in the group and clicks a "SEND" button, then Web terminal 70 transfers the entered data to the Internet gateway device 84. The latter registers the received member name and telephone number in the member table of database 83 in association with the group ID. FIG. 14 shows an example of the structure of the member table.

Management of Group Information

Figure 15:
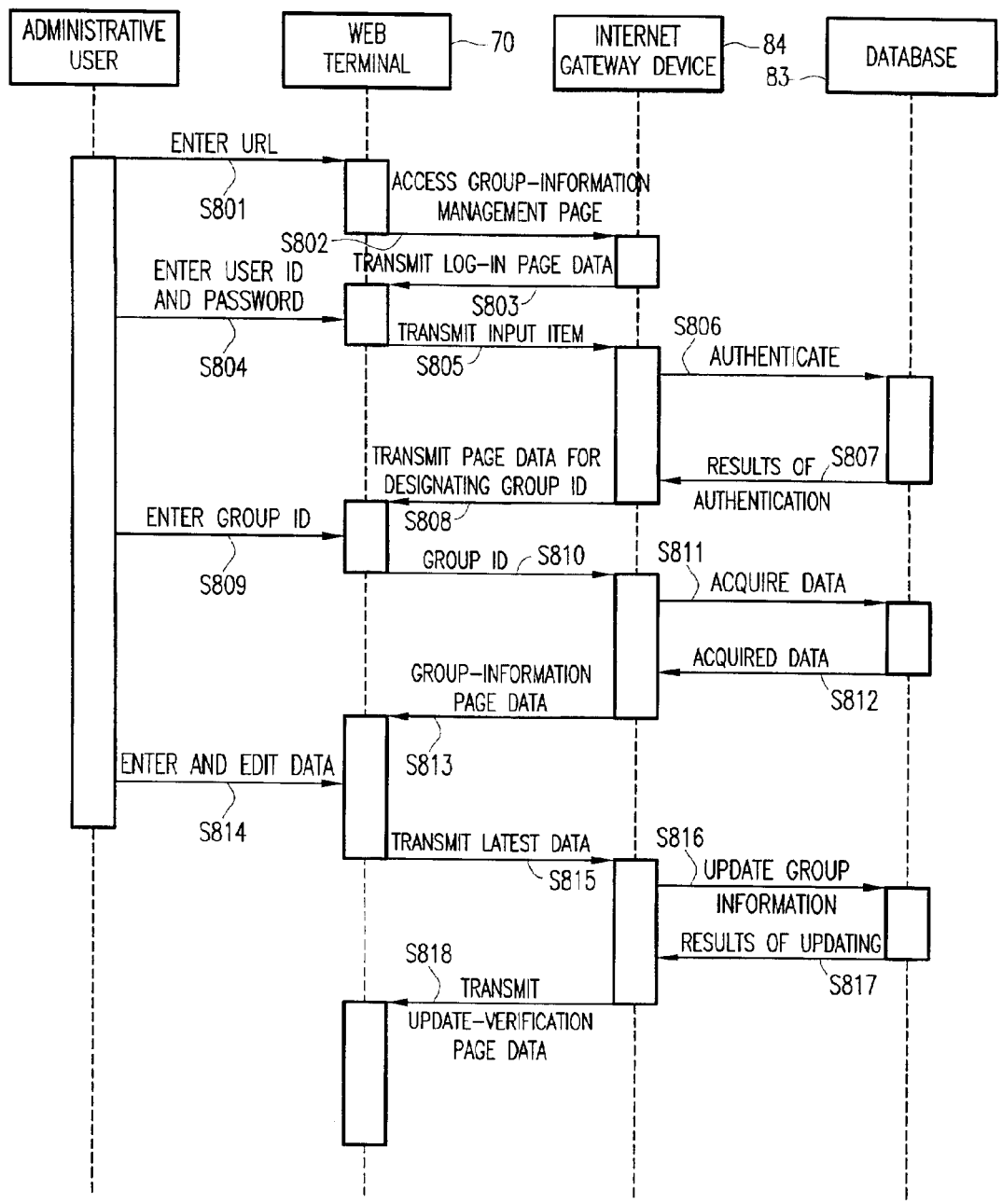
FIG. 15 is a sequence chart for describing group-information management processing using the communication control apparatus according to this embodiment of the present invention.

Processing for managing group information will be described with reference to the sequence chart shown in FIG. 15. Management of group information includes addition and deletion of members, editing of member information and deletion of groups, etc., and is allowed to be executed only by an administrative user.

A request to access a group-information management page and processing for user authentication are performed at steps S801 to S807. These processing steps need not be described because the processing is the same as that described at steps S701 to S708 of FIG. 8. The only difference is the URL entered at step S801.

At step S808, the Internet gateway device 84 transmits, to the authenticated administrator, user page data requesting group designation for prompting the user to enter the group ID of the group to undergo processing. At this time the group table of database 83 may be searched based upon the user ID received at step S805 and the corresponding group ID that has been acquired may be presented on the page that requests group designation.

When the group ID desired by the administrative user is entered (or selected), the Web terminal 70 transmits the group ID to the Internet gateway device 84 (step S810). Using the received group ID, the Internet gateway device 84 searches the member table of the database 83 and acquires information (member name and telephone number) of the group member registered in the designated group (steps S811 and S812). The Internet gateway device 84 transmits group-information page data, which contains the acquired information, to the Web terminal 70.

FIG. 16 illustrates an example of the group-information page. If necessary, the administrative user changes the telephone number or member name of a member or designates deletion of a member and then clicks an "OK" button (step S814). All member information (and whether or not to designate deletion) is transmitted from the Web terminal 70 to the Internet gateway device 84 (step S815).

The Internet gateway device 84 reconstructs the member table of the database 83 (steps S816~S817) using information, which is contained in the received member information, concerning members for which deletion has not been designated. It may be so arranged that if there is a member for which deletion has been designated, the Internet gateway device 84 transmits page data for confirmation of deletion to the Web terminal 70, without immediately reflecting designation of deletion in the member table, and then reconstructs the member table after obtaining re-confirmation.

When the reconstruction of the member table is completed, the Internet gateway device 84 transmits page data for notifying of such completion to the Web terminal 70 (step S818).

Furthermore, if the "OK" button is not clicked on the group-information page but a link to a member-addition page displayed below the button is clicked, then the above-described member registration processing (processing from transmission of the member registration page onward) is executed. Further, if a link to processing for deletion of an entire group is clicked, then the Internet gateway device 84 transmits page data for reconfirmation of deletion. If confirmation is obtained, then the Internet gateway device 84 deletes the related data from the database 83.

Communication Control Service

Figure 17:
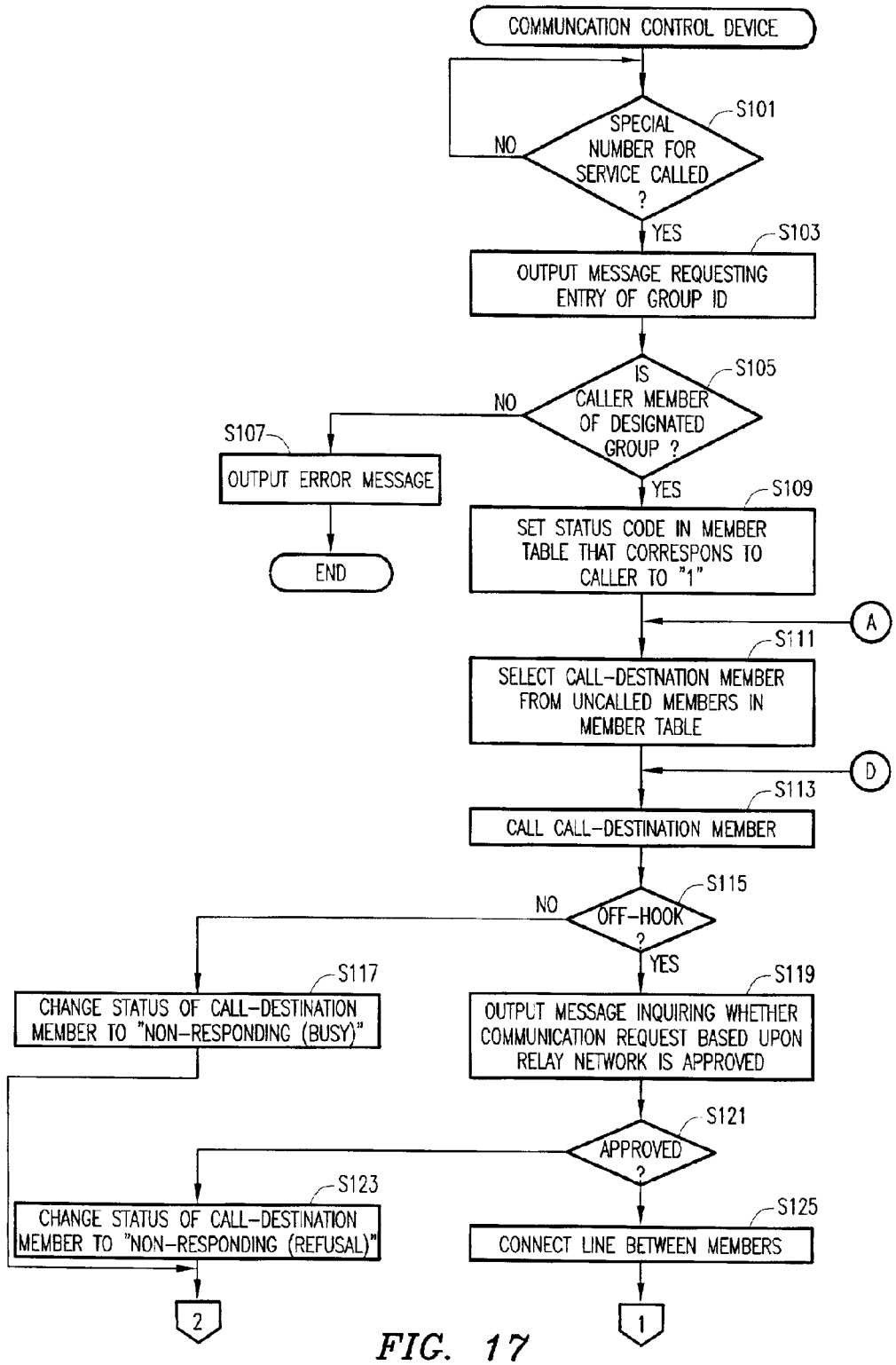
FIG. 17 is a flowchart for describing processing for a communication control service using the communication control apparatus according to this embodiment of the present invention.

A communication control service in the communication control apparatus according to this embodiment will be described with reference to the flowcharts of FIGS. 17 to 19. As set forth above, the communication control service in the communication control apparatus according to this embodiment is utilized from a telephone (or from a device having an equivalent function).

First, at step S101, the SSP 81 of the communication control apparatus 80 waits for a call to be made to a special telephone number (special number) decided in advance for the call relay service. If a user (assumed by way of example to be the user of mobile station 10 in FIG. 1) who desires utilization of the call relay service calls the special number, the SSP 81 of the communication control apparatus 80 is so notified via the base station 20 and mobile service exchange 30.

Upon receiving notification of the call, the SSP 81 requests the SCP 82 to start processing for providing the service. In response, the SCP 82 starts service processing, reads a message, which requests entry of the group ID, from a group of voice messages stored in the database 83, and transmits the message to the user terminal (mobile station 10) via the SSP 81 (step S103).

In response to the voice message, the user employs a telephone keyboard, for example, to enter the group ID of the group to which this user belongs (i.e., to which the member who desires transmission of a message using the call relay service belongs). In the description that follows, it will be assumed that the user of mobile station 10 is member "Aki" in the member table of FIG. 14 and that group ID "3587" has been designated.

A DTMF signal that is output in response to pressing of the keypad and that corresponds to the keys pressed is detected and identified by the SCP 82. The SCP 82 refers to the member table of the database 83 (step S105) using the identified group ID and the subscriber number of the caller terminal (mobile station 10) acquired when notification of the call was received at step S101.

If the member table corresponding to the group ID (3587) includes the subscriber number (090-111-XXXX) of the caller terminal, it is determined that the caller is a user who can utilize the service. Then it is determined whether or not the call relay service is presently operating in the same group. If the call relay service is currently operating in the same group, then a message to the effect that the service for application to this group cannot be accepted because the service is already in operation is output to the caller and processing is exited. Thus, according to this embodiment, control is exercised in such a manner that two or more call relay services cannot be executed simultaneously with respect to one and the same group.

If the call relay service is not currently active in the same group, then a code "1", which is indicative of an initiating member, is set (step S109) in a status-code field (see FIG. 14) of the record corresponding to the caller in the relevant caller table. At the same time, recording of a log in service processing is started. The content of the log will be described hereinafter.

FIG. 21(*a*) illustrates, in extracted form, the member name fields and status code (SC) fields of the main table when step S109 is executed.

If it is found at step S105 that a member table corresponding to the group ID designated by the user does not exist or that the member table exists but the subscriber number does not, a decision is rendered that the user is one who cannot receive provision of the service. The SCP 82 then reads an error message from the database 83, transmits it to the user terminal 10 (step S107) and instructs the SSP 81 to disconnect the line. The SSP 81 disconnects the line to the user terminal 10 and terminates processing for the communication control service.

Furthermore, it is possible to adopt an arrangement in which before the SSP 81 is instructed to disconnect the line, a voice message for inquiring the group ID is to be entered again is output and then user authentication processing (step S105) is executed in accordance with the response.

If the SCP 82 sets a status code with regard to an initiating member at step S109, then, from among the group members other than the initiating member, a single uncalled member is selected as a call-destination member (step S111). In this embodiment, the member selected as the call-destination member is an uncalled member or non-responding member (processing for selecting a call-destination member from non-responding members will be described hereinafter). Selection of a call-destination member can be carried out by any method. For example, selection can be in order of decreasing or increasing record number in the member table, or selection can be made randomly. Since random selection is not possible in an ordinary call relay network, such selection is effective as a communication tool in that it increases opportunities for parties who are unknown to each other to communicate. Here it will be assumed that a random selection is carried out and that the uncalled member "Bob" has been selected as the call-destination member.

Further, it is possible for detection of an uncalled (non-responding) group member from the member table to be carried out using a status code in the table. Specifically, in this embodiment, the member table is provided with status code fields for storing status codes that indicates the status of each member, as shown in FIG. 14. It will suffice to detect a member having a status code indicative of an uncalled (non-responding) member in the code field. A status code can be set at will. In this embodiment, however, status codes are assigned in the manner shown by way of example in FIG. 20. Therefore, in order to detect a group member who is an uncalled member, for example, it will suffice to detect the member whose status code is "0".

At step S113, the SCP 82 instructs the SSP 81 to call the call-destination member ("Bob") selected at step S111. The SSP 81 calls the call-destination member and waits for a response (step S115).

If a response is received within a predetermined period of time at step S115, the SCP 82 reads a voice message out of the database 83 and outputs it to the call-destination member who has responded (step S119). An example of the voice message is as follows: "THIS CALL IS IN ACCORDANCE WITH THE RELAY CALL SERVICE IN GROUP XX, IN WHICH YOU ARE REGISTERED. DO YOU WISH TO HEAR A RELAYED MESSAGE FROM ANOTHER GROUP MEMBER AND TO TRANSMIT THE CONTENT OF THE MESSAGE TO A DIFFERENT GROUP MEMBER? IF 'YES', PRESS THE '*' KEY; IF 'NO', PRESS THE '#' KEY."

It is possible to provide a choice in which the called party can select not temporary refusal (meaning that the party intends to respond to a call originated again in the same service processing) but refusal of subsequent incoming calls relating solely to this particular execution of service processing (refusal on a per-service-execution basis) or refusal of all future calls concerning the call relay service for group members (permanent refusal), and to assign keys different from the "*" and "#" keys for the purpose of making these responses. Such a member is subsequently registered as a member excluded from calls on a per-service-execution basis or as a member permanently excluded from calls, and the member is removed from members targeted for calls. A member excluded from calls registers a status code indicative of this fact, thereby making it possible to identify this in subsequent processing.

If the call-destination member presses the "*" key to approve the call from the call-originating member at step S121, the line between both members is connected (step S125). The call state continues from the moment the user of the terminal 10, namely the initiating member, calls the special number for the service until the moment the connection to the call-destination member is made at step S125. The call-originating member (the initiating member in the initial case) conveys the message, which is desired to be relayed orally, to the call-destination member.

Figure 18:
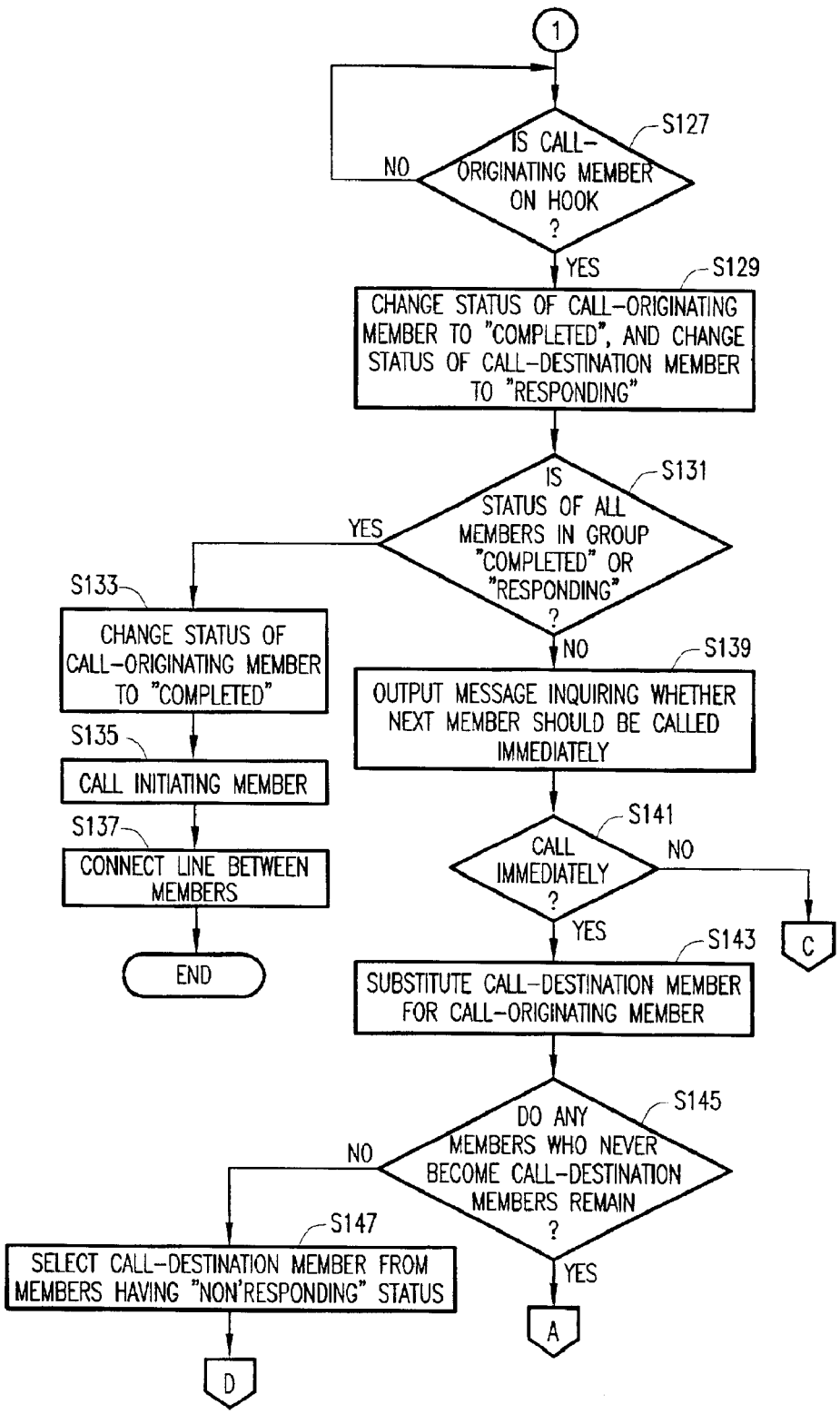
FIG. 18 is a flowchart for describing processing for a communication control service using the communication control apparatus according to this embodiment of the present invention.

If the call-originating member who has finished conveying the message ends the call (step S127) in FIG. 18, the SCP 82 changes the status code in the member table corresponding to this call-originating member to a code signifying "COMPLETED" (the code is changed to "91" respect to the initiating member and to "99" with respect to other members). Further, the SCP 82 changes the status code of the call-destination member to "10", which means that this member becomes the next call-originating member. The status of the member table at this time is shown in FIG. 21(b).

Next, the SCP 82 refers to the status codes of the member table and determines whether the status codes of all members within the group (if a member excluded from calls exists, this member is excluded) signify "COMPLETED" or "RESPONDING" (step S131). Since members having the "NON-RESPONDING" status exist, control proceeds to step S139.

At step S139, the SCP 82 reads a message out of the database 83 and transmits the message to the call-destination member ("Bob"). The message inquires as to whether the next member should be called immediately or upon elapse of a predetermined period of time. If a response to the effect that the next member should be called immediately is detected inquiry made at step S119, then the SCP 82 substitutes the current call-destination member ("Bob") for the call-originating member (step S143).

Next, the SCP 82 determines whether a member having the uncalled status remains in the member table (step S145). If a member having the uncalled status remains, the control proceeds to step S111 and processing for selecting a call-destination member is repeated. If all members with the exception of the initiating member have been called once, then a call-destination member is selected from members having the "NON-RESPONDING" status (status codes 20~22) at step S147, and control returns to step S113. At this time a selection in accordance with the type of status code may be made, as will be described later. For example, a "NON-RESPONDING" status of a prescribed type may be selected preferentially or selection thereof may be postponed.

In the state shown in FIG. 21(b), uncalled members exist and therefore control returns to step S111 and the call-destination member is selected from among the uncalled members. (In this case, it is assumed that "Daniel" is selected.) It is assumed that "Daniel" was called at step S113 and that a response was not obtained within a predetermined period of time. In this case, control proceeds from step S115 to step S117. Here the SCP 82 changes the status code of the call-destination member ("Daniel") to "20", which signifies "NON-RESPONDING (BUSY)" [FIG. 21(c)].

Figure 19:
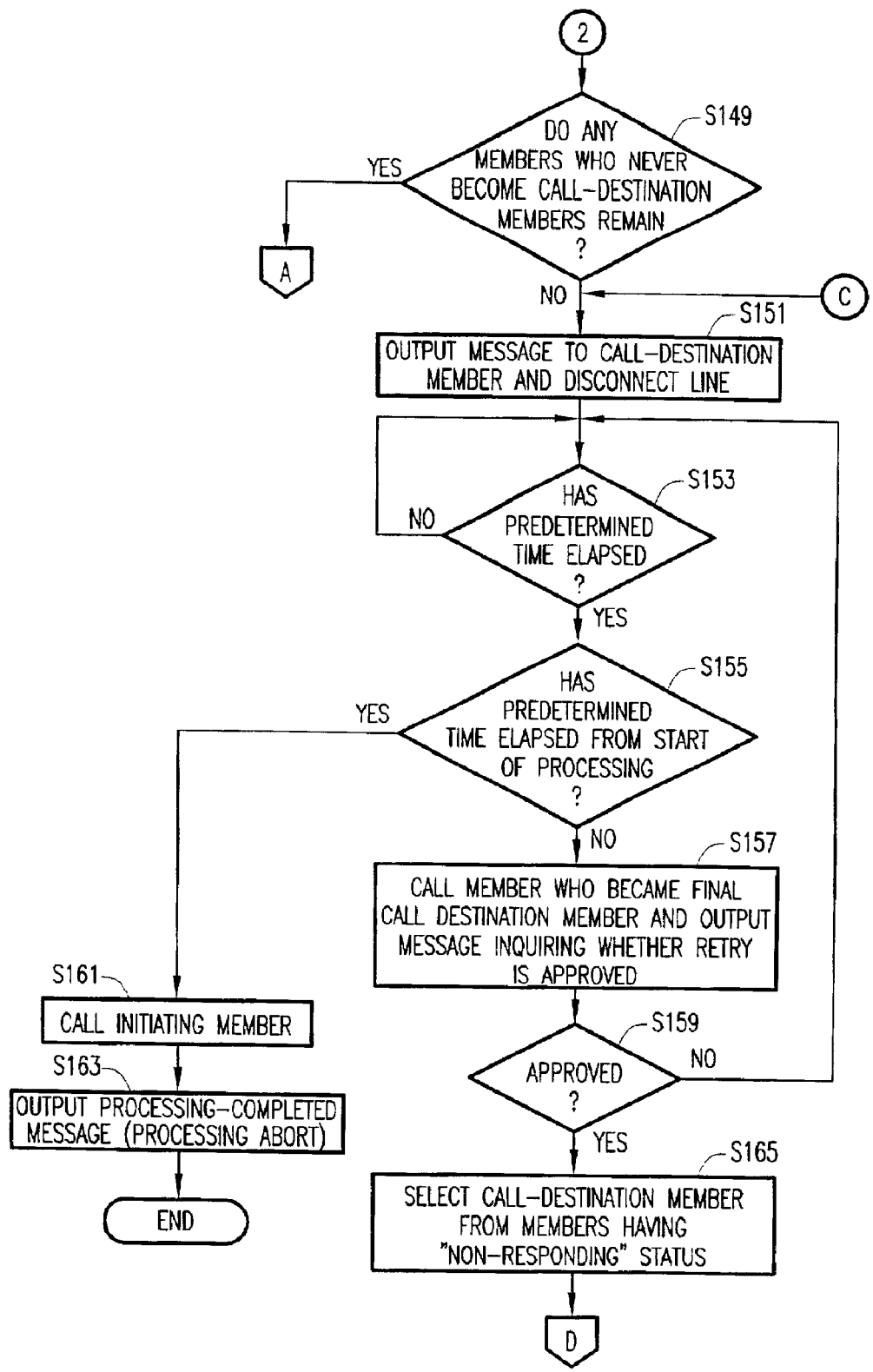
FIG. 19 is a flowchart for describing processing for a communication control service using the communication control apparatus according to this embodiment of the present invention.

Control then proceeds to step S149 (FIG. 19). Here, through processing similar to that of step S145, it is determined whether an uncalled member exists. In the state shown in FIG. 21(c), uncalled members exist. Accordingly, control returns to step S111 and a call-destination member is selected from the uncalled members (it assumed that "Ethan" has been selected).

Assume that the new call-destination member ("Ethan") called at step S113 has responded within a predetermined period of time (step S115) and that this member has approved the call based upon the call relay service at step S121 in a manner similar to that of the member "Bob". When the call-originating member ("Bob") finishes the conversation, the SCP 82 changes the status code of "Bob" to "99", which signifies "COMPLETED", and changes the status code of the call-destination member ("Ethan") to "10", which signifies "RESPONDING", at step S129 [FIG. 21(d)].

Since an uncalled member still exists, control proceeds from the decision of step S131 to step S139, at which a message inquiring about a call-destination member is output. Assume here that the call-destination member ("Ethan") responds that the call may be made immediately. Accordingly, the SCP 82 makes "Ethan" the new call-originating member (step S143) and advances control to step S111 upon traversing a decision regarding an uncalled member at step S145.

The SCP 82 selects the final uncalled member "Cathy" as the call-destination member at step S111. Assume that the result of the call made at step S113 is that this member has not responded within the predetermined period of time. In this case, control proceeds from step S115 to step S117, where the SCP changes the status code of the call-destination member ("Cathy") to "20", which signifies "NON-RESPONDING (BUSY)".

Since it is found at the decision of step S149 that all group members [with the exception of the initiating user and members excluded from being called (if any exist)] have already been called, control proceeds to step S151. At step S151, the SCP 82 temporarily disconnects the line and outputs a message to the call-originating member ("Ethan") because members to which the call has not been relayed are all non-responding members. This message states that a call will be made again after a predetermined period of time. The SCP 82 changes the status code of the call-originating member ("Ethan") to "11", which is indicative of standby [FIG. 21(e)].

Upon standing by for the predetermined period of time at step S153, the SCP 82 compares, with a predetermined upper-limit time, time that has elapsed from the moment the call from the initiating member was accepted (step S155). If the elapsed time is less than the upper-limit time, the SCP 82 calls the member ("Ethan") having the status code indicative of standby and outputs a message inquiring as to whether processing for the call relay service is to be continued immediately (step S157). If it is assumed that approval to execute retry has been obtained, the SCP 82 changes the status code of this member from standby ("11") to continuing ("10") [FIG. 21(f)] and advances control from step S159 to step S165.

If approval to resume the calling of members having the non-responding status is not obtained from the call-originating member ("Ethan") having the "RESPONDING (STANDING BY)" status, control returns again to step S153.

At step S165, the SCP 82 selects a member having the "NON-RESPONDING" status code from the member table as the call-destination member and repeats processing from step S113 onward.

Assume that "Cathy" is selected as the call-destination member at step S165 and that she now responds to the call. If it is assumed that the call in accordance with the call relay service has been approved (steps S119 to S127), then, at step S129, the SCP 82 changes the status code of the call-originating member ("Ethan") to "99" and changes the status code of the call-destination member ("Cathy") to "10" [FIG. 21(g)].

Since the member "Daniel" still has the "NON-RESPONDING" status, control proceeds from step S131 to step S139. If it is assumed here that the call-destination member ("Cathy") responds that another member may be called immediately, then the SCP 82 makes "Cathy" the new call-originating member (steps S141 to S143). Since it is found at step S145 that an uncalled member no longer exists, the SCP 82 selects "Daniel", who is the final uncalled member, as the call-destination member at step S147 and advances control to step S113.

If it is assumed that the call-destination member "Daniel" now responds to the call and approves the call based upon the call relay service (steps S119 to S127), then, at step S129, the SCP 82 changes the status code of the call-originating member ("Cathy") to "99" and changes the status code of the call-destination member ("Daniel") to "10" [FIG. 21(h)].

Since it is found at step S131 that the status of all members (with the exception of members excluded from being called, if such members exist) in the group is "COMPLETED" or "RESPONDING", control proceeds to step S133.

At step S133, the SCP 82 changes the status of the call-destination member ("Daniel") to "99", which signifies "COMPLETED" [FIG. 21(i)] and calls the initiating user ("Aki") (step S135). If the initiating user responds, the line between the members is connected (step S137) and processing is exited. Owing to the line connection made at step S137, the final member and the initiating member converse, thereby allowing the initiating member to recognize that conveyance of the message by the call relay service has ended. Recording of the service log also is terminated at this time.

At the same time the recording of the log ends, the SCP 82 clears the status codes in the member table. It should be noted that if there is a member who has refused an incoming call that is in accordance with the call relay service at his or her own volition at step S121 (namely a member permanently excluded from being called), the status code of this member is maintained and is not cleared. With regard to a member excluded from being called on a per-service-execution basis, this member will be a call candidate the next time service processing is executed and, hence, its status code is cleared.

Thus, the communication control apparatus according to this embodiment solves the problems possessed by the conventional call relay network, does not require a list and makes it possible to relay messages reliably.

Exception Processing In Communication Control Service

Exception processing not explained in the foregoing example will now be described.

First, if a response is made to a call from the SSP 81 at step S113 but connection of the line is refused by the decision rendered at step S121 (a temporary refusal is made by pressing the "#" key), then the status code of the call-destination member is changed to "21", which signifies "NON-RESPONDING (REFUSAL)", at step S123. Thereafter, control proceeds to step S149, just as in the case where there was no response (steps S115~S117).

It should be noted that it is also possible to change processing with respect to a member having another non-responding status upon taking into consideration a situation where a call-destination member has refused a call based upon the call relay service for some reason, in comparison with the case where this member fails to respond. For example, when a call-destination member is selected from members having the non-responding status (step S147 or S165), the selection can be made preferentially from members having a non-responding status other than "NON-RESPONDING (REFUSAL)" [e.g., from "NON-RESPONDING (BUSY)" or "NON-RESPONDING (PHONE-ANSWERING MACHINE)"].

Further, in a case where it has been made possible to select, in addition to temporary refusal, refusal on a per-service-execution basis or refusal (permanent refusal) inclusive of further service processing, an arrangement can be adopted in which the member is treated as a member excluded from being called only for the current service or as a member permanently excluded from being called, whereby this member is not selected as a call-destination member.

In the example of status codes of this embodiment shown in FIG. 20, an item "NON-RESPONDING (PHONE-ANSWERING MACHINE)" is provided as status code "22". This status can be used in a case where a response (off-hook) has been detected at step S115 but an appropriate response has not been obtained with regard to the message. That is, if the call-destination member is using an automatic answering machine such as a phone-answering machine, a response will be made to the call from the SCP 81 but no response will be obtained with regard to the inquiry as to whether or not the called based upon the call relay service should be accepted.

Accordingly, if, by way of example, an appropriate response (pressing of a designated key) is not obtained with regard to the inquiry message within a predetermined period of time, this status can be set in order to distinguish this situation from the above-mentioned "NON-RESPONDING (REFUSAL)". Processing with regard to a member having the "NON-RESPONDING (PHONE-ANSWERING MACHINE)" status may be made the same as or different from that of a member having another "NON-RESPONDING" status.

Further, in a case where a phone-answering machine has responded, generally a tone or beep for prompting the caller to start a recorded message is output. Accordingly, if the tone or beep has been detected within a predetermined period of time, a decision can be rendered to the effect that a phone-answering machine has responded, a message to the effect that the call being made is one based upon the call relay service, or the group ID of the group that is to receive the service and name of the initiating member, etc., can be output by voice and this can be recorded by the phone-answering machine.

Described next will be processing (FIG. 19, step S161 onward) in a case where processing has not ended normally even upon elapse of a predetermined time from arrival of the incoming call from the initiating member.

In this case, the SCP 82 decides to abort processing and calls the initiating member (step S161). The SCP 82 then outputs a message to the initiating member (step S163). The message states that the service has been aborted because processing did not end within the upper-limit time. The SCP 82 then terminates the recording of the service log.

An arrangement may be adopted in which a member whose status is "RESPONDING (STANDING BY)" is called in order to convey a message to the effect that processing will be aborted because time has run out. Further, it is possible to change the "RESPONDING (STANDING BY)" status to a status such as "RESPONDING (TIME OUT)".

An arrangement may be adopted in which the upper-limit time of processing is set by the operator who is running the communication control apparatus of this embodiment or is allowed to be set by the initiating member.

Though various other exceptions occur besides those described above, these can be dealt with by any of a variety of methods but they need not be described in detail as they do not have a direct bearing upon the essence of the present invention.

Communication Control Service: Service-Log Recording

The communication control apparatus according to this embodiment records a log of the communication control service, as mentioned above. By recording the log and publicly disclosing the content thereof as part of the information management service, group members inclusive of the initiating member can check the status of the call relay service currently being implemented (or implemented last).

The log may have any recorded event or recording item. An example is shown in FIG. 22. The service log in FIG. 22 includes the date and time of every event occurrence, call-originating members, call-destination members and the status of each member. The log recording is carried out by the SCP 82 and data is recorded in a prescribed area of the database 83 in association with the group ID.

A specific example of log recording will now be described with reference to FIG. 22. Furthermore, the log shown in FIG. 22 is in conformity with the progress of processing exemplified in the description of the communication control service.

First, the initiating member is authenticated and recording is performed when a call is first made to a call-destination member [FIG. 22(a)]. Accordingly, the member recorded initially as the call-originating member is the initiating member and the status of this member is made "CALLING". The name of the call-destination member is recorded as the call destination. Furthermore, status in the log is recorded not as a status code but as specific content.

If the call-destination member responds and gives approval to immediate calling of the next call-destination member, then a new event is added on when the call is originated. In this case, the call-originating member is the call-destination member of the preceding event and the status of the call-originating member is recorded as the status. Since the call-destination member "Daniel" does not respond to the call from member "Bob", a "NONRESPONDING" event is added to the log [FIG. 22(b)].

Since "Daniel" does not respond, "Bob" calls "Ethan" [FIG. 22(c)]. "Ethan" responds and calls the next call-destination member "Cathy". However, since "Cathy" does not respond and there is no uncalled member, "Ethan" stands by [FIG. 22(d)].

Then, after elapse of a predetermined period of time, processing resumes and "Cathy" is called again. As a result, "Cathy" responds and "Cathy" calls the remaining member "Daniel" immediately. Then "Daniel" responds, "Daniel" calls the initiating member "Aki" and processing ends owing to a response from "Aki" [FIG. 22(e)]. Processing for recording the service log is thus executed.

Information Management Service: Processing For Disclosing Group Information

Figure 23:
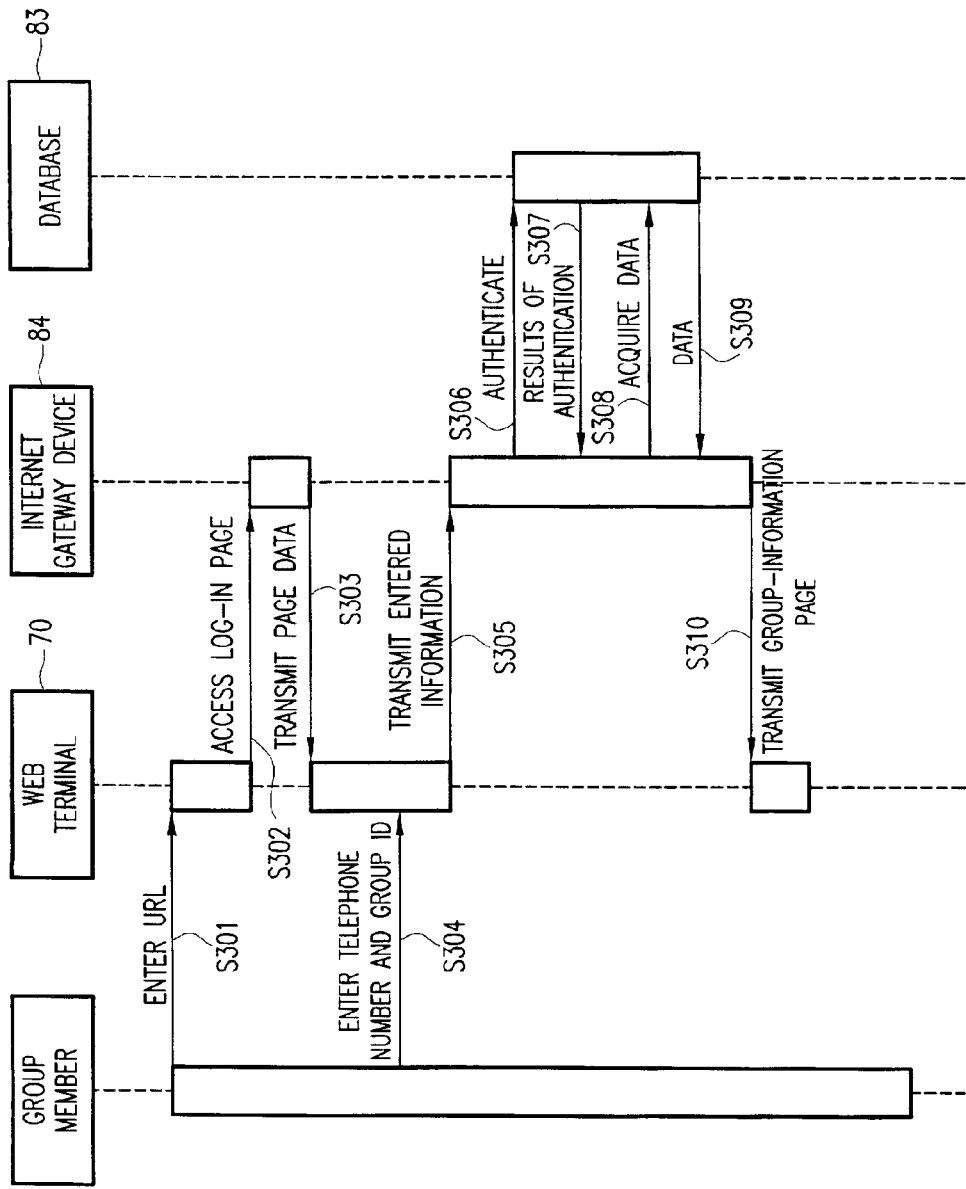
FIG. 23 is a sequence chart for describing processing for accessing group information using the communication control apparatus according to this embodiment of the present invention.

Processing for disclosing the service log and other group-related information to group members will now be described with reference to the sequence chart shown in FIG. 23. Since this processing is executed as one information processing service of the communication control apparatus 80 according to this embodiment, a group member utilizes this service from the Web terminal 70.

First, the group member enters the URL corresponding to the group-information perusal page to the browser software, etc., of the Web terminal 70, thereby instructing access (step S301). The Web terminal 70 requests transmission of log-in page data (step S302), and the Internet gateway device 84 functioning as the Web server transmits log-in page data for accessing the group information (step S303). An example of this log-in page is illustrated in FIG. 24.

Since perusal of group information is allowed to be performed only by members belonging to the group, the log-in page requests entry of information necessary for authentication, namely telephone number and group ID. If the group member enters these items of information and clicks a "SEND" button (step S304), the information is transmitted to the Internet gateway device 84 via the Web terminal 70.

The Internet gateway device 84 searches the member table of database 83 using the received telephone number and group ID and determines whether the group having the designated group ID has the designated telephone number (steps S306, S307). If authentication has been performed correctly, the Internet gateway device 84 acquires the group information of the designated group from the database 83 (steps S308, S309), incorporates it with the group-information page data and transmits the result to the Web terminal 70 (step S310).

Figure 25:
FIG. 25 is a diagram showing an example of a group-information page presented to a group member in processing for accessing group information.

FIG. 25 illustrates an example of the group-information page in a case where the latest log information is supplied as the group information. FIG. 25 illustrates a case where processing for the call relay service has ended. However, if the group-information page is accessed under conditions in which processing is still in progress, the same page will provide the up-to-the minute log information prevailing at such time. This means that a group member can check, easily and in real time, members who have transmitted the message and members who have not responded, etc.

If authentication cannot be performed correctly at steps S308, S309, as when the designated group ID does not exist or the designated telephone number has not been registered as a telephone number of a group member, log-in page data containing an error message is transmitted to the Web terminal 70 and processing from step S304 onward is repeated.

It is also possible to disclose other information as group information, such as a list of members registered with the group. In this case, if authentication has been performed correctly, it will suffice to transmit page data for selecting the information desired and disclose the information that conforms to the result of the selection. If a list of group members is disclosed, is it preferred that the telephone numbers of the members not be disclosed, unlike the case where a user is the administrator.

Other Embodiments

The foregoing embodiment illustrates an arrangement in which the communication control apparatus 80 is connected to a mobile wireless communication network. However, if it is possible to detect the special number for the service and connection to a data communication network is possible, then it is possible to make the connection to any location, starting with a public switched telephone network (PSTN, ISDN).

Further, the foregoing embodiment has been described taking as an example a case in which the communication control apparatus 80 employs as the Web terminal 70 a device other than a telephone that is capable of acquiring a subscriber number. However, it goes without saying that if the communication control apparatus 80 employs as the Web terminal 70 a telephone capable of acquiring the subscriber number, authentication processing can be executed without requiring entry of the telephone number.

In the embodiment described above, call processing with regard to the same non-responding member can be executed any number of times from elapse of a prescribed period of time from arrival of a call from the initiating member.

Therefore, if the number of times call processing executed with regard to a non-responding member is counted at, e.g., step S117 or step S123, and there is no response to a call made a prescribed number of times, then this member can be dealt with as a member excluded from being called within this execution of processing. If this arrangement is adopted, the time needed for overall processing can be shortened and, moreover, it is possible to alleviate the burden on members whose status is "CONTINUING" ("STANDING BY"). The count can be implemented by providing the member table with a redial count field and storing in this field the number of times redialing is performed. The status code of a member for which the count has exceeded an upper-limit number of calls is changed to a code signifying that the member has been excluded from being called (excluded from calls on per-service-execution basis).

In this case is should be noted that a member who has not responded to a call made a prescribed number of times is dealt with as a member excluded from calls on per-service-execution basis but becomes a candidate for calls if a new call relay service for the same group is initiated the next time. Therefore, to distinguish this member from a member who, on his or her own volition, wishes to be excluded from being called (a member excluded from calls permanently), it is desirable that the two members be made distinguishable by assigning them different status codes. In this embodiment, a member excluded from being called because the number of calls to this member has exceeded the upper limit is assigned a status code "80" as the code of a member excluded from calls on a per-service-execution basis. Hence a status code is applied that differs from status code "21" of "NON-RESPONDING (REFUSAL)", which indicates temporary refusal, and status code "88", which indicates a member excluded from calls permanently.

Further, in a case where a member excluded from being called temporarily, on a per-service-execution basis or permanently occurs, the initiating member is notified of this and is prompted to verify it on the group-information page.

Similarly, if processing is aborted because time runs out, the initiating member is notified of the existence or absence of any non-responding members (who may be one or more members excluded from being called temporarily, on a per-service-execution basis or permanently) and of the member names at step S163 and is prompted to verify this on the group-information page.

Thus, in accordance with the present invention, as described above, it is possible to construct and utilize a call relay network easily and reliably without using a call relay network list and special equipment.

Obviously, many modifications and variations of the present invention are possible in light of the above teachings. It is therefore to be understood that within the scope of the disclosed concept, the invention may be practiced otherwise than as has been specifically described.

What is claimed:

1. A communication control apparatus for providing a group composed of prescribed members with a call relay service, said apparatus comprising:
    a communication control system which is operable in response to commencement of the call relay service, upon request from an initiating member who is any member belonging to said group, to cyclically connect a line between the respective members in said group, in an order starting from the initiating member.

2. A communication control apparatus according to claim 1, wherein said communication control system comprises:
    a member selection component for selecting, from the members belonging to said group, a call-destination member included among target members that are subjected to said call relay service;
    a line connection component for calling said call-destination member and connecting a line from said call-destination member to a call-originating member; and
    a control component responsive to commencement of said call relay service for connecting a line cyclically between said target members in said group by continually executing line connection processing until no target members are left, said line connection processing including adopting said initiating member as a call-originating member by controlling said line connection component so as to connect a line between a call destination member that has been selected by said member selection component and said call-originating member, and if disconnection of said line is detected, removing said call-destination member from said target members, adopting said call-destination member as a new call-originating member, and controlling said line connection component so as to connect a line between a call-destination member newly selected by said member selection means and said new call-originating member.

3. A communication control apparatus according to claim 2, wherein said control component has a management table for managing whether each member belonging to said group is said target member, and for managing call status with regard to each member.

4. A communication control apparatus according to claim 3, wherein in if the call-destination member does not respond when said call-destination member is called, said control component stores said call-destination member in said management table as a non-responding member and controls said line connection component in such a manner that said call-destination member newly selected by said member selection component is called.

5. A communication control apparatus according to claim 3, wherein said control component controls said member selection component based upon said management table in such a manner that a member among said target members that has not been selected as said call-destination member in the past is selected preferentially.

6. A communication control apparatus according to claim 4, wherein if a member among said target members that has not been selected as said call-destination member in the past does not exist when reference is made to said management table, said control component controls said member selection component in such a manner that said call-destination member is selected from said non-responding members.

7. A communication control apparatus according to claim 2, wherein if said call connection processing is completed with respect to the final target member, said control component controls said line connection component so as to connect a line between said final target member and said initiating member.

8. A communication control apparatus according to claim 2, wherein said control component aborts said line connection processing if said line connection processing with regard to all of said prescribed target members belonging to said group has not been executed within a predetermined period of time.

9. A communication control apparatus according to claim 6, wherein in if a response is not obtained when said call-destination member that has been selected from said non-responding members is called, said control component controls said line connection component so as to temporarily halt said line connection processing and, upon elapse of a predetermined period of time, controls said line connection component so as to connect a line between said call-destination member that has been selected from said non-responding members and said call-originating member that prevailed prior to halting of processing.

10. A communication control apparatus according to claim 6, wherein if said line connection processing applied to a particular non-responding member fails a predetermined number of times, said control component removes said particular non-responding member from said target members.

11. A communication control apparatus according to claim 8, wherein if said line connection processing is aborted, said control component connects a line to said initiating member and outputs a message indicating that processing has been aborted.

12. A communication control apparatus according to claim 2, wherein said apparatus further includes group information management means for managing information relating to said group.

13. A communication control apparatus according to claim 12, wherein said group information management means allows an administrative member, previously registered among the members belonging to said group, to access and alter, selectively, administrator information contained in said information relating to said group.

14. A communication control apparatus according to claim 13, wherein said administrator information includes member-specific information concerning each member belonging to said group.

15. A communication control apparatus according to claim 14, wherein said member-specific information includes at least the member name and telephone number of each of said members.

16. A communication control apparatus according to claim 12, wherein said group information management means allows any member belonging to said group to access general information contained in the information relating to said group.

17. A communication control apparatus according to claim 16, wherein said general information includes at least processing history of said line connection processing with regard to the members belonging to said group.

18. A communication control apparatus according to claim 13, wherein said group information management means provides said administrator information or general information, selectively, when a request is received from a member belonging to said group by means of a prescribed communication line.

19. A communication control method for providing a group composed of prescribed members with a call relay service comprising:
 a communication control step, performed in response to commencement of the call relay service upon request from an initiating member who is any member belonging to said group, of cyclically connecting a line between the members in said group, in an order starting from the initiating member.

20. A communication control method according to claim 19, wherein said communication control step comprises:
 a member selection step of selecting, from the members belonging to said group, a call-destination member included among target members that are subjected to said call relay service;
 a line connection step of calling said call-destination member and connecting a line from said call-destination member to a call-originating member; and
 a control step of connecting a line cyclically between said target members in said group by continually executing line connection processing until no target members are left if start of said call relay service has been requested, said line connection processing including adopting said initiating member as a call-originating member, controlling said line connection step so as to connect a line between a call destination member that has been selected by said member selection step and said call-originating member, and if disconnection of said line is detected, removing said call-destination member from said target members, adopting said call-destination member as a new call-originating member, and controlling said line connection step so as to connect a line between a call-destination member newly selected by said member selection step and said new call-originating member.

21. A communication control method according to claim 20, wherein said control step includes using a management table for managing whether each member belonging to said group is said target member, and for managing call status with regard to each member.

22. A communication control method according to claim 21, wherein if the call-destination member does not respond when said call-destination member is called, said control step includes storing said call-destination member in said management table as a non-responding member, and controlling said line connection step so that said call-destination member newly selected by said member selection step is called.

23. A communication control method according to claim 21, wherein said control step includes controlling said member selection step based upon said management table in such a manner that a member among said target members that has not been selected as said call-destination member in the past is selected preferentially.

24. A communication control method according to claim 22, wherein if a member among said target members that has not been selected as said call-destination member in the past does not exist when reference is made to said management table, said control step controls said member selection step in such a manner that said call-destination member is selected from said non-responding members.

25. A communication control method according to claim 20, wherein if said call connection processing is completed with respect to the final target member, said control step controls said line connection step so as to connect a line between said final target member and said initiating member.

26. A communication control method according to claim 20, wherein said control step includes aborting said line connection processing if said line connection processing with regard to all of said prescribed target members belonging to said group has not been executed within a predetermined period of time.

27. A communication control method according to claim 24, wherein if a response is not obtained when said call-destination member that has been selected from said non-responding members is called, said control step includes controlling said line connection step so as to temporarily halt said line connection processing and, upon elapse of a predetermined period of time, controlling said line connection step so as to connect a line between said call-destination member that has been selected from said non-responding members and said call-originating member that prevailed prior to halting of processing.

28. A communication control method according to claim 24, wherein if said line connection processing applied to a particular non-responding member fails a predetermined number of times, said control step removes said particular non-responding member from said target members.

29. A communication control method according to claim 26, wherein if said line connection processing is aborted, said control step includes connecting a line to said initiating member and outputting a message indicating that processing has been aborted.

30. A communication control method according to claim 20, wherein said method further includes a group information management step of managing information relating to said group.

31. A communication control method according to claim 30, wherein said group information management step allows a member, previously registered as an administrative member among the members belonging to said group, to access and alter, selectively, administrator information contained in said information relating to said group.

32. A communication control method according to claim 31, wherein said administrator information includes member-specific information concerning each member belonging to said group.

33. A communication control method according to claim 32, wherein said member-specific information includes at least the member name and telephone number of each of said members.

34. A communication control method according to claim 30, wherein said group information management step allows any member belonging to said group to access general information contained in the information relating to said group.

35. A communication control method according to claim 34, wherein said general information includes at least processing history of said line connection processing with regard to the members belonging to said group.

36. A communication control method according to claim 31, wherein said group information management step provides said administrator information or general information, selectively, when a request is received from a member belonging to said group by means of a prescribed communication line.

* * * * *

UNITED STATES PATENT AND TRADEMARK OFFICE
CERTIFICATE OF CORRECTION

PATENT NO. : 6,917,673 B2
APPLICATION NO. : 10/128925
DATED : July 12, 2005
INVENTOR(S) : Sawada et al.

It is certified that error appears in the above-identified patent and that said Letters Patent is hereby corrected as shown below:

In Column 11, Line 22, after "detected" insert -- owing to pressing of a prescribed key, for example, as in the manner of the response to the --.

Signed and Sealed this

Twentieth Day of November, 2007

JON W. DUDAS
*Director of the United States Patent and Trademark Office*